United States Patent [19]

Luckenbill et al.

[11] 3,870,431
[45] Mar. 11, 1975

[54] CUTTER FOR PLASTIC PIPE AND DRILLING TOOL
[75] Inventors: Lawrence F. Luckenbill; Daniel A. Ellis, both of Decatur, Ill.
[73] Assignee: Mueller Co., Decatur, Ill.
[22] Filed: Dec. 18, 1973
[21] Appl. No.: 425,791

[52] U.S. Cl. ................ 408/111, 408/138, 408/204
[51] Int. Cl. ..................... B23b 47/18, B23b 51/04
[58] Field of Search .......... 408/205, 204, 207, 206, 408/703, 101, 110, 111, 138

[56] References Cited
UNITED STATES PATENTS
2,287,354  6/1942  Misch ................................. 408/101
2,978,002  4/1961  Ranson .............................. 408/205

*Primary Examiner*—Gil Weidenfeld
*Attorney, Agent, or Firm*—Cushman, Darby & Cushman

[57] ABSTRACT

A cutter member for use in cutting a hole in plastic pipe having a thick wall or a thin wall. The cutter member is rotated and advanced with a positive predetermined lead against the pipe, the cutter member being so designed that after it has cut the initial chips off the outside curvature of the pipe, it cuts a continuous chip by a peeling action and the initial chips and continuous chip are discharged inwardly of the cutter member above the coupon being cut. The cutter member may be repeatedly used and it can be used with a drilling tool or machine or, for that matter, a tapping tee. The preferable drilling machine for use with the cutter machine is of simple construction, including a tubular body member, a two-piece boring bar with one member having threads thereon for positively advancing the cutter member, and the other member of the boring bar being adapted to receive the cutter member. The drilling tool is detachably attached to a pipe or to a fitting operatively connected to the pipe, the fitting having the usual passageway therethrough and the boring bar being arranged to extend through the passageway to the wall of the pipe to be cut. The drilling tool is provided with means where the boring bar can be rapidly advanced to the cutting position or rapidly retracted after cutting and, further, the drilling tool is designed to prevent blow out of the boring bar when cutting pipes under pressure.

30 Claims, 6 Drawing Figures

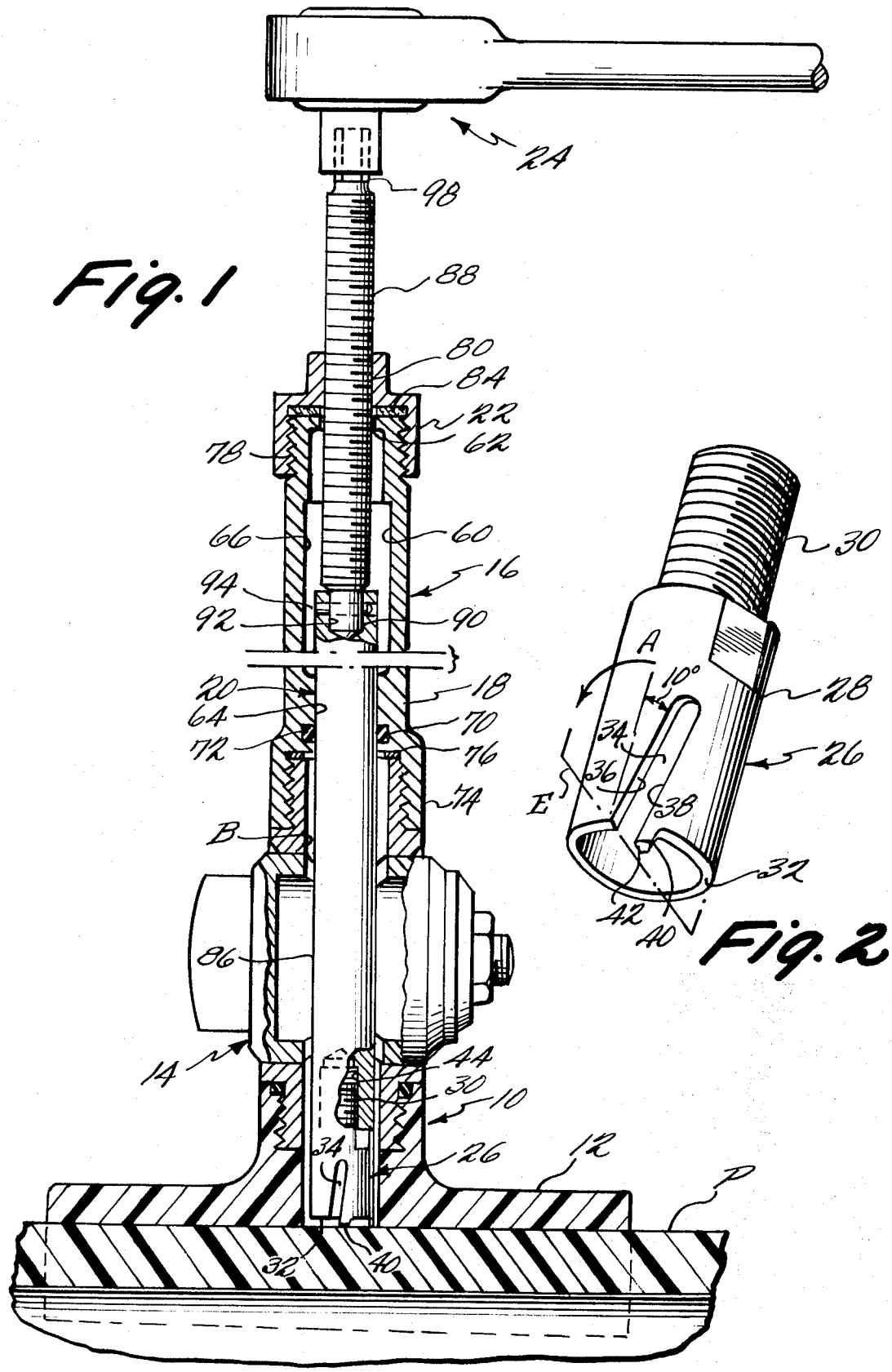

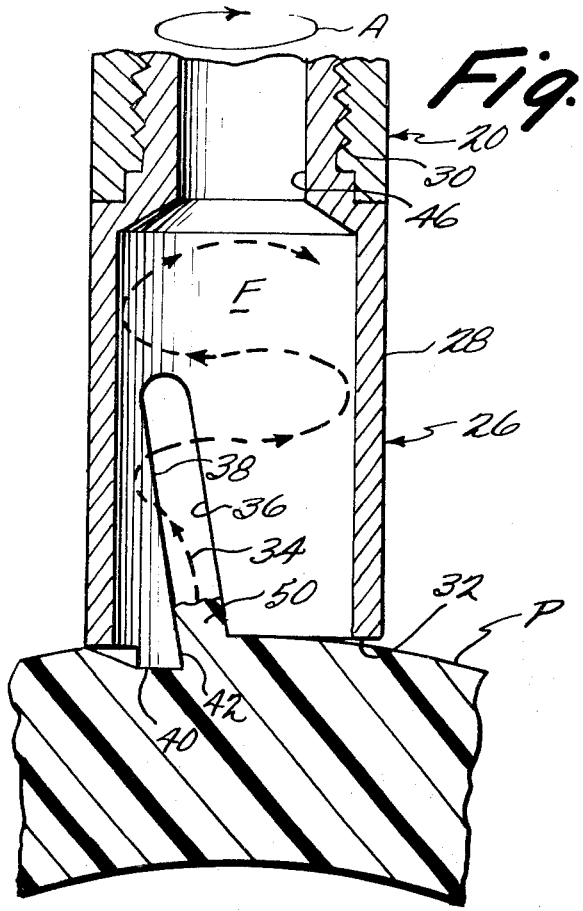
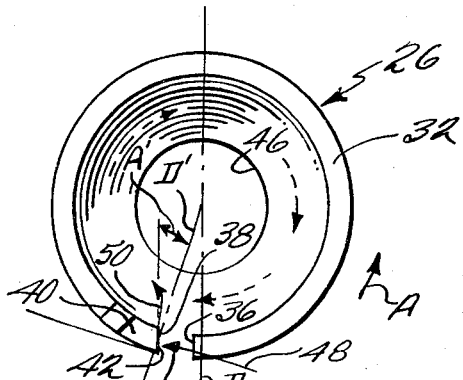
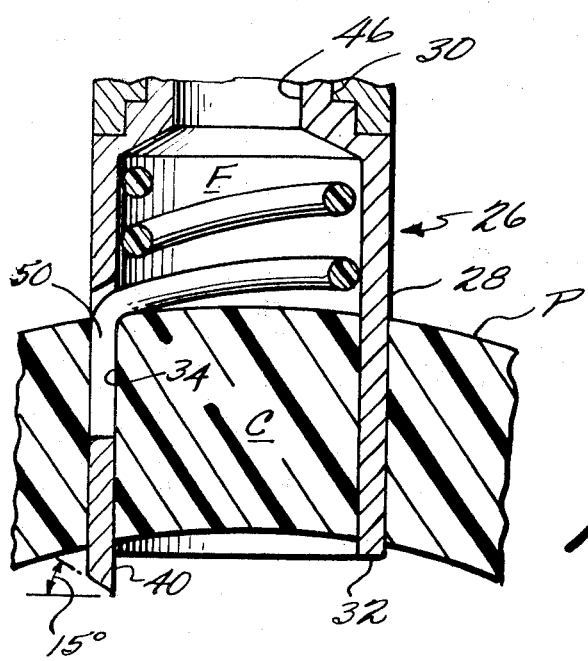
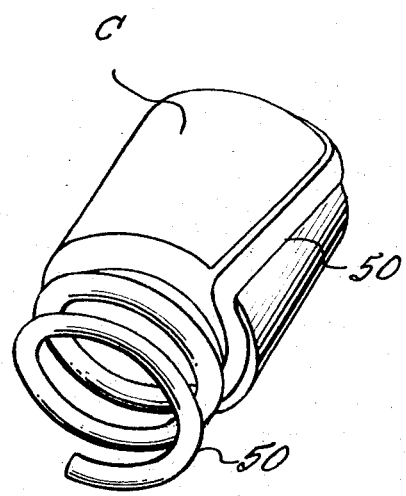
Fig. 3
Fig. 5
Fig. 6
Fig. 4

CUTTER FOR PLASTIC PIPE AND DRILLING TOOL

The present invention relates to an improvement in a cutter member and a drilling tool for use in cutting a hole in a plastic pipe or main when it is desirous to set up a flow way between the plastic pipe of a fluid distribution system, such as gas or water, and a secondary pipe or service line. More particularly, the present invention provides a cutter member which, after initial chips are cut from the curved surface of the pipe, cuts a continuous chip by a peeling action and helically feeds the chip being cut upwardly in a slot in the cutter member between the hole in the pipe being cut and the coupon and then into the cavity in the cutter member above the coupon. The drilling tool is of simplified construction and includes a two-piece boring bar which can be rapidly advanced to cutting position and then the cutting bar can be rotated with a predetermined lead for cutting the uniform continuous chip from the plastic pipe. The drilling tool is so designed that the boring bar cannot be blown out of the same when cutting a hole in a pressurized pipe.

BACKGROUND OF THE INVENTION

Existing stainless steel knife cutters have been used for cutting holes in plastic pipe, the knife cutters being made from a thin wall cylindrical band of stainless steel. These knife cutters have a continuous knife edge on their cutting end defined either by an internal beveled surface, an external beveled surface, or by a knife edge having both internal and external beveled surfaces, such as the knife cutter disclosed in the copending application Ser. No. 296,588 of Robert R. Roos, filed Oct. 11, 1972, now U.S. Pat. No. 3,771,546, and assigned to the same Assignee as this Application. These band type knife cutters were usually attached to a plug which could be rotatively advanced with a predetermined lead in a tapping tee of these knife cutters were used on a boring bar of a drilling tool adapted to be attached directly to the pipe or to a fitting secured to the pipe and having a flow passageway therethrough. The high cutting torques made the operation of either the tapping tee or the drilling tool difficult and the high thrust loads also tended to dull the cutters quickly whereby they either had to be sharpened or discarded. Such knife cutters were not practical for thick wall plastic pipe and when used on thin wall plastic pipe, they had problems of retaining coupons where the knife edge had but a single bevel, either internal or external, as the hole cut in the pipe was not truly round. Additionally, such knife cutters required high thrust loads to operate and this created buckling problems when used on thin wall PVC pipe.

Shell cutters have been used for many years in cutting metal pipe, the shell cutters being used with positive feed drilling tools or machines. Shell cutters were not particularly adapted to use on plastic pipe as the chips were not controlled and often times these chips would move outwardly of the flutes of the shell cutter during the cutting action and, thus, when the coupon had been cut and the shell cutter was removed from the pipe, the chips could fall backwards into the pipe. This had a disadvantage when used in fluid distribution systems, such as gas and water, as the chips could interfere with the operation equipment downstream of where the hole was being cut, such as valves or the like.

Drilling tools or machines for use with knife cutters of the prior art where a relatively small hole is being drilled into a plastic pipe have had the disadvantage in that they utilize a long one-piece small diameter boring bar which is quite prone to warpage due to machining. Additionally, such small diameter one-piece boring bars, when they become damaged in the field, require replacement of the entire boring bar and this represents a material expense when considered with the overall cost of the drilling tool.

The prior art drilling tools or machines had a further disadvantage in that when they were designed to provide for rapid adjustment of the boring bar to either position the cutter member prior to cutting or to remove the cutter member quickly from the hole cut, the boring bar could be blown out once the cut had been made and if the pipe being cut were under fluid pressure.

Prior art arrangements of rotary cutter members which are related to the present invention may be found in the following patents:

| | | |
|---|---|---|
| 765,877 | Brownstein | July 26, 1904 |
| 1,145,822 | Wilder | July 6, 1915 |
| 2,179,029 | Barnes | November 7, 1939 |
| 2,748,817 | Stearns | June 5, 1956 |
| 2,978,002 | Ransom | April 4, 1961 |

In the above-mentioned patents, it will be noted that the cutter members are of the shell type or the plug type which are primarily arranged to work on a flat surface wherein disposition of the chips is not important. Also, it will be noted that in those cutters where there are flutes or slots, the trailing face of the flutes or slots lie on a diameter of the cutter member which would cause chips to be moved to the outside of the cutter member and also the slots are of such a width that they cannot control the chips during the cutting action.

Prior art arrangements of drilling tools or machines related to the present invention may be found in the following patents:

| | | |
|---|---|---|
| 154,862 | Hand et al | September 8, 1874 |
| 455,890 | Smith | July 14, 1891 |
| 986,844 | McCloskey | March 14, 1911 |
| 1,065,248 | Hinman | June 17, 1913 |
| 3,516,426 | Toll | June 23, 1970 |
| 3,646,954 | Hutton | March 7, 1972 |

BRIEF SUMMARY OF THE INVENTION

The present invention provides an improved cutter member for cutting a hole in thick or thin wall plastic pipe, as well as an improved drilling tool or machine for use with the cutter member. While the rotatable cutter member of the present invention is particularly adaptable for use with a drilling tool, either attached directly to the plastic pipe or attached to a fitting having a passageway thereto, the fitting being attached to the plastic pipe, the cutter member of the present invention could also be useful with service tapping tees, such as plastic tapping tees, or the like. However, the preferable use is with a drilling tool or machine since the cutter member is capable of use more than once, whereas cutter members used with service tees are primarily "one shot" cutters which remain in the service tees after use. The drilling tool or machine of the present invention is disclosed herein in use with the particular cutter member of the present invention, but it will also be appreciated by those skilled in the art that the drilling tool could also be used with conventional knife cutters for cutting plastic pipe or, for that matter, shell cutter members for cutting holes in metal pipe.

The rotatable cutter member of the present invention advances a predetermined lead and cuts a continuous chip by a "peeling" action as the coupon is being cut from the plastic pipe. The cutter member includes a cylindrical-shaped metal hollow body member having a wall thickness sufficient to resist distortion during cutting, the cutter member being provided with at least one slot in its wall extending in a generally lengthwise direction, but preferably at an acute trailing angle from the direction of rotation of the cutter member. A tooth of short arcuate extent projects axially from the flat end surface of the cylindrical body member with the tooth having its forward face providing a continuation of the trailing face of the slot. Also, the tooth has a thickness substantially equal to the wall thickness of the cylindrical body member and while it has a relief from its inside wall to its outside wall, it does not have a relief in its arcuate direction from its face. Both the face of the tooth and the trailing face of the slot in the body member of the cutter member are oriented so that the continuous chip being formed moves upwardly in the slot between the wall of the hole being cut and the coupon being cut and then is directed inwardly into the cavity within the hollow body member above the coupon. The length of the slot longitudinal of the body member of the cutter member is greater than the wall thickness of the pipe being cut so that sufficient clearance is allowed for the continuous chip to be received above the coupon and, thus, permit the cutter member to extend completely through the wall of the pipe. Additionally, the tooth projects axially from the flat end surface of the body member of the cutter member a distance slightly greater than the lead of the cutter member to eliminate all bearing between the flat end of the cutter member of the plastic pipe as it cuts, thereby reducing torque during cutting and thrust loads which might produce buckling of the pipe.

Since the continuous chip being cut when the hollow cutter member is being rotated and advanced must travel smoothly up the slot and into the cavity of the cutter member above the coupon, the width of the slot cannot be too great or too small. It has been found that the width of the slot has to be at least as wide as the wall thickness of the cutter member, but not greater than three times the wall thickness of the cutter member with the optimum or preferred width of the slot being in the order of twice the wall thickness of the cutter member. The tooth of the cutter member has the same thickness as the wall thickness of the cutter member and if the slot has less width than the wall thickness, the chip is wider than the slot and there is a tendency of too much material from the continuous chip jamming in the slot causing increased torque and, eventually, pipe collapse or push away. Likewise, if the slot is too wide, the continuous chip being cut from the plastic pipe would have too much room to move about in the slot and there is a possibility of it getting out of the slot area between the outside wall surface of the cutter member and the hole being cut or between the inside surface of the cutter member and the coupon being cut, thus, also causing too much torque and/or the dropping of chips. The slot, as previously mentioned, is at an angle to a plane through the axis of the cutter member and, thus, is effectively helical. While the slot could extend in an axial direction with respect to the cutter member, the angle is preferred since the continuous chip being removed fills this slot and when the coupon is finally cut through and the cutter member is withdrawn from the hole cut, this angle will assist in retaining the coupon in the cutter member. Additionally, the outside surface of the cutter member is ground smooth to reduce torque, whereas the inside surface of the cutter member is left slightly rough and this roughness also assists in retaining the coupon in the hollow cylindrical body member of the cutter member.

The drilling tool or machine of the present invention is of simplified design in that it includes a tubular body member and a two-piece boring bar, one member of the boring bar being utilized for attaching the cutter member thereto, whereas the other member of the boring bar is threaded and arranged to be advanced through a threaded disengagement nut. The two members of the boring bar are pinned together which permits replacement of either part rather than the entire boring bar when either part is damaged in field service. Additionally, the tubular body member of the drilling tool has a reduced bore at its outer end which receives the threaded member of the boring bar, but which is of less diameter than the diameter of the outer member of the boring bar. This arrangement has the advantage in that the disengagement nut can be removed after boring and if the pipe being bored is under pressure, the boring bar cannot be blown out of the tubular body member. By providing an O-ring in an O-ring groove in the body member, the boring bar does not have to be provided with a groove as in the past and, thus, small diameter boring bars may be made without reducing their strength. The disengagement nut, which provides for positive rotational advancement of the boring bar and cutter member during cutting, may be disengaged from the tubular body member so that the boring bar can be either rapidly advanced prior to cutting or rapidly retracted after cutting.

BRIEF DESCRIPTION OF THE DRAWINGS

FIG. 1 is a vertical sectional view, partly in elevation, and illustrating the drilling tool of the present invention, as well as the cutter member of the present invention attached to the boring bar of the drilling tool, the assembly being mounted on a fitting on a plastic pipe, the pipe being shown in longitudinal section;

FIG. 2 is a perspective of the cutter member of the present invention;

FIG. 3 is an enlarged vertical sectional view of the cutter member, the view illustrating the cutter member beginning its cut on the curved outer surface of the plastic pipe, the pipe being shown in transverse section;

FIG. 4 is a view similar to FIG. 3, but illustrating the cutter member just after it has completed cutting the hole in the plastic pipe, the view showing the slot of the cutter member in a different position with the continuous chip being helically fed into the cavity above the coupon;

FIG. 5 is a bottom end view of the cutter member of the present invention; and

FIG. 6 is a perspective view of a coupon cut from a plastic pipe by the cutter member disclosed in FIGS. 2–5, inclusive.

DETAILED DESCRIPTION OF THE INVENTION

Referring now to the drawings, wherein like characters or reference numerals represent like or similar parts and, in particular to FIG. 1, there is disclosed a plastic pipe P having a fitting generally designated at 10 mounted thereon, the fitting having a passageway B therethrough. The fitting 10 may be any suitable fitting used in fluid distribution systems, on pipe where it is desired to drill a hole in the pipe for the purpose of connecting the pipe to a service line (not shown), or the like. The particular fitting 10, illustrated in FIG. 1, is of the service tee type including a plastic saddle member 12 secured to the pipe by any suitable means, such as solvent-welding, friction welding, a combination of either of these welding operations, with the use of a mechanical clamp means or solely by mechanical clamping means. The saddle has provided thereon valve means 14 which may be closed after a hole is drilled and then subsequently opened when a service line is connected to the valve means. While the valve means 14 is shown as a rotary plug valve, it could be a gate valve, ball valve, or the like.

In the particular environment shown, a drilling tool or machine generally designated at 16, is directly attached to the valve means or it may be attached by an adapter fitting, depending upon the particular type of outlet of the valve means. The drilling tool or machine 16 generally comprises a tubular body member 18, a two-piece bar 20, a disengagement nut 22, and handle means 24 for rotatively advancing the boring bar 20. At the lower end of the boring bar 20, a cutter member 26 of the present invention is attached for cutting a hole in the plastic pipe.

Before describing the drilling tool 16 in more detail, it is believed best to describe the improved cutter member 26 by referring to FIGS. 2–5, inclusive. In this respect, it should be understood that the cutter member 26 is the type which must be rotatively advanced with a predetermined lead or predetermined axial movement for each rotation of the boring bar and in the engagement shown, the positive advancement is accomplished by the drilling tool 16. However, it is within the scope of the present invention of the cutter member 26 that the cutter member could be of the type which is installed in a service tee (not shown) where means are provided to positively advance and retract the same by rotary movement.

Referring now to FIGS. 2–5, inclusive, the cutter member 26 includes a cylindrically-shaped metal hollow body member 28 having a reduced shank portion 30 at one end thereof, the shank portion being threaded for reception into a threaded portion in the lower end of the boring bar 20. The tubular hollow body member 28 is preferably made of stainless steel and it has its outside wall surface ground smooth to reduce torque during operation with its interior wall surface left slightly rough to assist in retaining the coupon after the hole is cut in the plastic pipe P. The lower end of the hollow body member 28 is provided with a flat end surface 32 normal to the longitudinal axis of the body member. The wall of the hollow body member 28 is provided with at least one slot 34 therein which extends in a generally lengthwise direction of the body member 28, the slot being specifically oriented to provide for control of the material being cut from the pipe P to form the hole therein. Assuming that the cutter member 26 is rotated in the direction of arrow A, FIGS. 2, 3, and 5, the slot 34 has a leading face 36 and a trailing face 38. A tooth 40 of short arcuate extent projects axially from the flat end surface 32 of the body member 28, the tooth having the same wall thickness as the body member, and it has its forward face 42 in the direction of rotation which is a continuation of the trailing face 38 of slot 34. Of course, since the tooth 40 has the same wall thickness as the body member 28, its outside wall surface and its inside wall surface are respectively continuations of the outside wall surface and the inside wall surface of the body member 28.

As mentioned above, the orientation of the slot is critical in providing accurate control of the material being cut from the pipe P. In this respect, the slot is positioned with at least one-half of its width following a diameter D of the tubular body member 28 in the direction of rotation with its leading face 36 and trailing face 38 at least parallel a place passing through this diameter. By such an arrangement, the leading face 36 of the slot either lies on a diameter of the body member or is slightly rearward of such a diameter when the body member is rotated with the trailing face being rearwardly of this position and since both faces 36 and 38 are parallel to each other, the trailing face 38, as well as the face of the tooth 42, will be at an acute angle A' with diameter D' through the outside edge of the same, as shown in FIG. 5, and, thus, when there is cutting of a chip from the plastic pipe, the faces 38 and 42 are oriented so as to direct chips inwardly above the coupon being cut.

The slot 34 is angled rearwardly in a direction of rotation in an amount in the order of 10° from a plane through the axis of the body member 28. This is best shown in FIG. 2 where E represents a plane extending through the forward face 36 and the angle of 10° is shown. By angling the slot rearwardly, it is effectively a helical slot and it serves two functions. First, it permits centerless grinding of the outside wall surface of the tubular body member 28 to make the same smooth without creating a relatively large hump or lump on the outside wall surface at 180° from the slot. Secondly, a portion of the continuous chip cut by the cutter member remains in the slot 34 once the wall thickness of the pipe P has been cut completely through and since this continuous chip is still attached to the wall of the coupon, withdrawal of the cutter member 26 from the hole in the pipe P permits the chip still left in the slot 34 to assist in retaining the coupon in the cavity of the body member 28. It should also be remembered that the inside wall surface of the body member is not ground smooth and its slight roughness also assists in retaining the coupon C in the cutter member upon withdrawal.

The length of the slot 34 is determined by the thickness of the pipe P to be cut. Since the continuous chip cut by the tooth 40 is fed upwardly in the slot 34 and then helically inwardly into the cavity above the coupon, the slot must be long enough to permit sufficient clearance at the upper end for the chip to enter the cutter cavity at all times during the cutting of the coupon. Consequently, the slot length should be at least equal to the thickness of the pipe P to be cut, plus at least two times the axial length which the tooth 40 projects from the flat end surface 32 of the body member 28.

As will be evident from FIGS. 1 and 3, the tooth 40 has no relief in its arcuate extent. It has been accepted practice for shell cutters in the past to provide such relief. By not providing a relief in the arcuate direction of the tooth, this prevents the tooth from planing during cutting and provides a more uniform thickness for the continuous chip being peeled from the plastic pipe P. While the tooth 40 has no relief in an arcuate direction, it does have relief from its inside wall surface to its outside wall surface in the order of 15°, as shown in FIG. 4. The purpose of providing a relief in this direction is to prevent a flange from being formed and left on the lower end of the coupon at the end of the cutting action. If a flange is left on the coupon, there is a possibility that this flange might catch on the hole cut in the plastic pipe P when the cutter member 26 is removed and this could possibly cause the coupon being pulled out of the cutter member and dropping into the pipe.

The height of the tooth 40 or its axial projection from the flat end surface 32 of the body member 28 is slightly greater than the lead of the cutter member 26. In other words, if the cutter member advances axially x inches for a single revolution of the same, the axial projection of the tooth is slightly greater than this x inches and this eliminates the flat end surface of the body member 28 bearing or dragging on the plastic pipe P during cutting, resulting in further reduction of torque and/or thrust loads.

As has been mentioned heretofore, the body member 28 of the cutter member 26 has an exteriorly threaded shank portion 30 of reduced diameter. The shank portion 30 is arranged to be received in interior threads of a closed bottom bore 44 of the lower end of the boring bar 20, the shank end portion having an axial passage 46 therethrough, which is open at its upper end and communicates with the cavity C in the hollow body member where the chip or chips are stored. The purpose of providing a passageway 46 in the shank portion is to provide a means whereby the cutter member 20, after cutting a hole in the pipe P and withdrawn therefrom, can be removed from the boring bar, the passageway 46 providing a port through which a tool, such as a pick, screwdriver, or awl, can be inserted to easily eject the coupon and chips from the cutter so that the cutter member can be used again.

While the exterior of the body member 28 is ground smooth to help in reducing torque, it may also be coated with a lubricant if so desired. One such lubricant may be a coating of dry film teflon, but, of course, other such dry film lubricant coatings or other lubricants may be used.

Referring now to FIG. 3, it will be noted that the cutter member 26, which is rotating in the direction of the arrow A, is just beginning to make a cut in the curved surface of the pipe P. As will be appreciated, because of the curvature of the pipe P, the first several revolutions of the cutter member 26 will remove chips from longitudinally spaced portions on the pipe P and these chips will be fed up the slot 40 and directed inwardly into the cavity F above the coupon C. However, once the cutter member 26 has advanced far enough for the tooth 40 to be continuously in contact with material of the pipe P, the tooth 40 will cut a continuous chip by a "peeling" action and this chip, which is of uniform thickness and width, will be fed up the slot 34 in the cutter member and helically inwardly above the coupon C being cut.

Referring to FIG. 5, the orientation of the trailing face 38 and of the front face 42 of the tooth 40 is such that the material being peeled as a continuous chip will turn in rather than out, as shown diagrammatically, by the arrows 48 and 50. The turning in of the continuous chip occurs immediately above the top surface of the coupon C and the chips are helically wound in the cavity F of the cutter member 26 above the coupon C. As shown in FIG. 4, the cutter member 26 has rotated and advanced complete through the wall thickness of the pipe P, and it will be noted that the coupon C is completely formed with a lip at the bottom and that the chip extends up the slot 34 between the wall of the coupon and the wall of the hole cut and then inwardly to the cavity F where it roughly assumes the shape of a helix. FIG. 6 represents a perspective view of a coupon C cut from the pipe P and it will be noted that the continuous chip, which is identified by the numeral 50, extends up the side of the coupon and then curls in somewhat of a helix above the top of the coupon. Since the width of the slot 34 is controlled for the size of the continuous chip 50 being cut, the chip proceeding up the side of the coupon tightly presses against the coupon C and there is a slight fusion of this portion of the chip to the coupon after complete cutting of the coupon so that when the cutter member 26 is removed, the angle of this portion of the chip, with respect to the longitudinal axis of the cutter member 26, assists in retaining the coupon in the cutter member until the cutter member has been completely retracted and removed from the boring bar. As described above, a tool can then be inserted through the port passageway 46 in the shank end portion of the cutter member 26 and the coupon C can be forced out of the cutter member.

Referring now to FIG. 1, the drilling tool or machine 16, while shown in use with the novel cutter member 26, may also be used with other types of cutter members for cutting holes in plastic pipe or, for that matter, metal pipe. The drilling tool, which has been briefly described at the outset of this specification, is of a unique simplified design which is inexpensive to manufacture and yet capable of performing its drilling operation.

In more detail, the tubular body member 18 has a bore 60 completely therethrough which is of reduced diameter, as indicated at 62, at the upper end of the tubular body member, whereas the lower end has a diameter 64 which is larger than the diameter 62. Intermediate the ends of the tubular member 18, the bore is provided with an enlarged portion 66 which provides a lubricant reservoir. The larger diameter bore 64 has an annular groove 70 therein for receiving an O-ring 72, whereas the lower end 74 of the tubular body member 18 is interiorly threaded so that it may be detachably connected to the fitting 10 or to an adapter member (not shown) between a fitting and the tubular body member 18. A gasket or seal 76 is provided between the end of the body member 18 and the fitting 10.

The upper end 78 of the tubular body member 18 is exteriorly threaded and detachably receives the interior threaded disengagement nut 22, the disengagement nut having an interiorly threaded bore 80 therethrough. Inbetween the upper end 78 of the tubular body member 18 and the disengagement nut 22 is a leather, felt, or rubber wiper or seal 84, the purpose of which will be described later in this specification.

The two-piece boring bar 20 includes a lower elongated cylindrical member 86 to which the cutter member 26 is attached and it extends through the bore 64 and an upper elongated exteriorly threaded member 88, which is threadedly received in the disengagement nut 22. The upper member 88 is of less diameter than the lower member 86 and it has a reduced end 90 received in a bore 92 in the upper end member 86. A roll pin 94 detachably connects the two members together and provides a drive between the two members. The upper end 96 of the upper threaded member 88 is box-shaped, as indicated at 98, for receiving handle means 24, such as a bore rachet wrench or any other suitable wrench.

It should be noted that the diameter of the lower member 86 of the boring bar 20 is greater than the diameter of the bore 62 at the upper end of the tubular body member 18. This serves the function of preventing the boring bar 20 from being blown out of the body member 18 when the disengagement nut 22 is removed from the upper end of the tubular body member 18 after a hole has been cut in a pressurized pipe P.

As will be appreciated, the operation of the drilling tool is quite simple. Once the cutter member 26 has been attached to the lower end of the boring bar 20, the drilling tool 17 can then be attached to the fitting 10. The disengagement nut can be unthreaded from the tubular body 18 and the boring bar may be quickly rectilinearly advanced through the fitting 10 until the cutter member 26 engages the exterior of the pipe P. When this occurs, the disengagement nut 22 is threaded onto the body member 18 and then the handle means 24 is operated to rotate the boring bar 20 and advance the same with a predetermined lead determined by the threads of the member 88. After the coupon C has been cut from the pipe and it is desired to quickly retract the boring bar past the valve 86, the disengagement nut 22 is again removed from the body member 18 and the entire boring bar is retracted rectilinearly and the valve 14 is closed. Should the pipe P be under pressure and there is any tendency for the boring bar to blow outwardly, the increased diameter of the lower member 86 in such that it will engage the upper end of the tubular body member 28 since it cannot pass through the reduced bore 62.

By having the O-ring 72 positioned in a groove in the body, the lower member 86 of the boring bar does not have its strength reduced as in prior arrangements. Additionally, by having the reservoir 66 of lubricant, both the upper and lower members 88 and 86, respectively, of the boring bar 20 are lubricated during operation, especially the threads of the member 88 by the wiper 84. The two-piece arrangement of the boring bar 20 makes the boring bar easier and cheaper to manufacture and service. In this respect, a long one-piece small diameter boring bar is quite difficult to manufacture as it is prone to warpage due to machining. Additionally, should such a one-piece bar be damaged in field service, it is quite costly to replace, whereas with the arrangement of the present invention, only that portion of the boring bar which is damaged need be replaced.

The terminology used in this specification is for the purpose of description and not limitation, the scope of the invention being defined in the claims.

What is claimed is:

1. A rotatable cutter member for cutting a hole in a plastic pipe by cutting a coupon when the cutter member is positively advanced against the pipe a predetermined distance per rotation of the same, said cutter member comprising a cylindrically shaped metal hollow body member having an outside wall surface and an inside wall surface and a wall thickness sufficient to resist distortion during cutting of the hole in the plastic pipe and having a cutting end portion with a flat end surface along a substantial portion thereof being normal to a longitudinal axis of the body member and a shank end portion for attachment to a tool, said body member further having at least one slot in said wall extending in a generally lengthwise direction from said flat end surface, said slot having a leading face and a trailing face, as defined by direction of rotation of the cutter member, a tooth of short arcuate extent projecting from the flat end surface of the body member, said tooth having an outside wall surface, an inside wall surface, and a face in the direction of rotation of the cutter member which are continuations of said outside wall surface and said inside wall surface of said body member and said trailing face of said slot, respectively, said tooth projecting from the flat end surface of said body member a predetermined length being at least as great as the predetermined distance of advancement per rotation whereby bearing between the flat end surface of the body member and the pipe is substantially eliminated to reduce torque and/or thrust loads, and said slot being positioned with at least one-half its width being located on one side of a diameter of said body with its trailing face parallel to a plane through the diameter so that said trailing face is inclined toward the interior of said body and an acute angle is formed at the exterior edge thereof, whereby said face of said tooth and said trailing face of said slot are oriented so that initial chips and then a continuous peeling chip are cut from the pipe, fed upwardly in the slot, and inwardly into the hollow body member above the coupon.

2. A cutter member as claimed in claim 1 in which said leading face of said slot is parallel to said trailing face and is at least at or behind a plane through the diameter.

3. A cutter member as claimed in claim 1 in which said slot extends in the lengthwise direction at least a distance at least equal to a wall thickness of the pipe being cut, plus at least two times the projection of said tooth from the flat end surface of said body member whereby sufficient clearance is provided for chips to enter into the body member throughout the entire cutting of the coupon.

4. A cutter member as claimed in claim 1 in which the outside wall surface of said body member is smooth to reduce torque and wherein said inside wall surface of said body member is at least slightly rough to help in retaining the coupon when cut.

5. A cutter member as claimed in claim 1 in which said slot extends rearwardly in a direction of rotation at an angle to define a helical slot extending lengthwise from said flat end surface.

6. A cutter member as claimed in claim 5 in which said body member has its outside wall surface ground smooth.

7. A cutter member as claimed in claim 6 in which said helical slot has an angle in the order of 10°.

8. A cutter member as claimed in claim 1 in which the shank end portion of the body member is provided with a passageway therethrough communicating with the interior of the hollow body member whereby the coupon and the initial chips and the continuous peeling chip can be pushed out of the cutting end portion of the body member.

9. A cutter member as claimed in claim 1 in which the end of said tooth has a relief from its inside wall surface to its outside wall surface to prevent a flange from being formed on the coupon being cut.

10. A cutter member as claimed in claim 9 in which said relief is in the order of 15°.

11. A cutter member as claimed in claim 1 in which said shank end portion is provided with thread means for attaching to a tool.

12. A cutter member as claimed in claim 11 in which said body member is on its outside wall surface with oppositely disposed flats.

13. An apparatus for cutting a hole in a plastic pipe comprising:
a drilling tool adapted to be fixedly attached to the pipe, said drilling tool including a tubular body member, a boring bar extending completely through said tubular casing member, and means to rotate and positively advance said boring bar with a predetermined lead; and
a cutter member detachably mounted to one end of said boring bar, said cutter member comprising a cylindrically shaped metal hollow body member having an outside wall surface and an inside wall surface and a wall thickness sufficient to resist distortion during cutting of the hole and having a cutting end portion with a flat end surface along a substantial portion thereof normal to a longitudinal axis of the body member and a shank end portion for attachment to the boring bar, said hollow body member further having at least one slot therein extending from said flat end surface at a rearward angle relative to the direction of rotation, said slot having a leading face and a trailing face as defined by the direction of the rotation of the cutter member, a tooth of short arcuate extent projecting from the flat end surface of the body member, said tooth having an outside wall surface and an inside wall surface and a face in the direction of rotation which are continuations of said outside wall surface and said inside wall surface of the body member and said trailing face of said slot, respectively, said tooth projecting from the flat end surface of said body member a predetermined length being at least as great as the predetermined lead of said boring bar, and said slot being positioned with at least one-half of its width being located on one side of a diameter of said body m ember with its trailing face parallel to a plane through the diameter so that said trailing face is inclined toward the interior of said body and an acute angle is formed at the exterior edge thereof, whereby said face of said tooth and said trailing face of said slot are oriented so that initial chips and then a continuously peeling chip are cut from the pipe, fed upwardly in the slot between the coupon being cut, and then inwardly into the hollow body member above the coupon.

14. An apparatus as claimed in claim 13 in which said slot extends in a lengthwise direction of the body member of said cutter member at least a distance equal to a wall thickness of the pipe being cut, plus at least two times the projection of said tooth in a horizontal direction from the flat end surface of the body member whereby sufficient clearance is provided for the continuously peeling chip to enter into the body member through the entire cutting of the coupon.

15. An apparatus as claimed in claim 13 in which said body member has its outside wall surface ground smooth to reduce torque and in which said inside wall surface of said body member is at least slightly rough to help in retaining the coupon when cut.

16. An apparatus as claimed in claim 15 in which a dry film lubricant is coated on the outside wall surface of said body member.

17. An apparatus as claimed in claim 16 in which said dry film lubricant is teflon.

18. An apparatus as claimed in claim 13 in which said shank end portion is provided with a passageway therethrough communicating with the interior of the hollow body member whereby the coupon and the initial chips and the continuously peeling chip can be pushed out of the cutting end portion of the body member when the cutter member is detached from the said boring bar.

19. An apparatus as claimed in claim 13 in which said tooth has an end without tooth relief in an arcuate direction from the tooth face, said end of said tooth having a relief from its inside wall surface to its outside wall surface to prevent a flange from being formed on the coupon being cut.

20. An apparatus as claimed in claim 19 in which said relief on the end of said tooth is in the order of 15°.

21. An apparatus as claimed in claim 13 in which said boring bar includes a first elongated cylindrical member of predetermined diameter having one end adapted to attach to said cutter member and a second elongated threaded member of reduced diameter and detachably connected to said first member, and in which said tubular body member includes a bore of reduced diameter adjacent one end thereof which is less than the diameter of said first elongated member, but greater than the diameter of said second elongated member which extends therethrough whereby said boring bar cannot be blown out of said tubular body member.

22. An apparatus as claimed in claim 21 in which said means to rotate and positively advance said boring bar includes a disengagement nut threadedly received on the end of said tubular body member through which the second elongated member extends, said nut having a threaded bore therethrough for receiving said second threaded member of said boring bar, said disengagement nut being capable of removal of said tubular body to provide a means for rapid boring bar advance and retraction during field use.

23. An apparatus as claimed in claim 22 in which said tubular body member has a second bore at its opposite end of a diameter through which said first elongated member of said boring bar extends, and sealing means between said second bore and said boring bar.

24. An apparatus as claimed in claim 23 in which said sealing means between said second bore and said boring bar includes an annular groove in said second bore and an O-ring in said groove.

25. An apparatus as claimed in claim 21 in which said first elongated member is detachably connected to said second elongated member of said boring bar by means of a roll pin.

26. An apparatus as claimed in claim 21 in which said first elongated member of said boring bar is provided for a threaded bore at its end to which said cutter member is attached and in which the shank end portion of the body member of said cutter member is exteriorly threaded.

27. An apparatus as claimed in claim 21 in which said second elongated threaded member is provided with handle means on its outer end, said handle means being a rachet wrench for rotating said boring bar in either direction.

28. A cutter member as claimed in claim 1 in which said slot has a width at least as wide as the wall thickness of said body member and/or said tooth, but less than three times the wall thickness of said body member and/or said tooth.

29. A cutter as claimed in claim 1 in which said slot has a width in the order of twice the wall thickness of said body member and/or said tooth.

30. A cutter member as claimed in claim 1 in which said tooth is without tooth relief on its end in an arcuate direction from the tooth face.

* * * * *